(12) United States Patent
Shimizu

(10) Patent No.: US 9,403,408 B2
(45) Date of Patent: Aug. 2, 2016

(54) PNEUMATIC TIRE

(71) Applicant: The Yokohama Rubber Co., LTD., Minato-ku, Tokyo (JP)

(72) Inventor: Tsuyoto Shimizu, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/433,037

(22) PCT Filed: Apr. 7, 2014

(86) PCT No.: PCT/JP2014/060100
§ 371 (c)(1),
(2) Date: Apr. 1, 2015

(87) PCT Pub. No.: WO2014/185190
PCT Pub. Date: Nov. 20, 2014

(65) Prior Publication Data
US 2015/0210122 A1      Jul. 30, 2015

(30) Foreign Application Priority Data
May 14, 2013   (JP) .................. 2013-102355

(51) Int. Cl.
*B60C 11/03*      (2006.01)
*B60C 11/13*      (2006.01)
(Continued)

(52) U.S. Cl.
CPC . *B60C 11/04* (2013.01); *B60C 5/00* (2013.01); *B60C 11/0304* (2013.04); *B60C 11/0309* (2013.04); *B60C 11/1259* (2013.04); *B60C 11/13* (2013.01); *B60C 11/1307* (2013.04);
(Continued)

(58) Field of Classification Search
CPC .................. B60C 11/0304; B60C 2011/0348; B60C 2011/0395; B60C 11/1307
See application file for complete search history.

(56) References Cited

U.S. PATENT DOCUMENTS

| 4,635,694 A | * | 1/1987 | Hosokawa .......... B60C 11/0306 |
| | | | 152/209.9 |
| 2005/0121123 A1 | | 6/2005 | Nakagawa |

(Continued)

FOREIGN PATENT DOCUMENTS

| DE | 60 2004 001 839 | 1/2007 |
| JP | S57-147901 | 9/1982 |

(Continued)

OTHER PUBLICATIONS

Machine translation for Korea 2004-0027035 (no date).*
(Continued)

*Primary Examiner* — Steven D Maki
(74) *Attorney, Agent, or Firm* — Thorpe North & Western

(57) ABSTRACT

A pneumatic tire includes a tread portion that includes three main grooves extending in the tire circumferential direction, and four rows of land portions defined by each of the main grooves, wherein, in each of two rows of center land portions located on a tire equator side, one narrow groove extending in the tire circumferential direction and a plurality of inclined grooves extending from the narrow groove towards the outer side in the tire width direction are provided, in each of the two rows of shoulder land portions located on shoulder sides, a plurality of lug grooves extending in tire width direction and not connecting to the main grooves is provided, and a distance on the vehicle outer side and a distance on the vehicle inner side from groove edges on shoulder land portion sides of side main grooves to the tire equator are equal.

14 Claims, 5 Drawing Sheets

(51) Int. Cl.
  *B60C 11/04* (2006.01)
  *B60C 5/00* (2006.01)
  *B60C 11/12* (2006.01)

(52) U.S. Cl.
  CPC . *B60C2011/0341* (2013.04); *B60C 2011/0348* (2013.04); *B60C 2011/0353* (2013.04); *B60C 2011/0355* (2013.04); *B60C 2011/0369* (2013.04); *B60C 2011/0395* (2013.04)

(56) References Cited

U.S. PATENT DOCUMENTS

2010/0243120 A1* 9/2010 Kiwaki ............... B60C 11/0306 152/209.25
2013/0167996 A1* 7/2013 Oda ..................... B60C 11/04 152/209.18
2013/0248068 A1* 9/2013 Nakata ............... B60C 11/0306 152/209.18

FOREIGN PATENT DOCUMENTS

| | | |
|---|---|---|
| JP | H08-011508 | 1/1996 |
| JP | H08-048110 | 2/1996 |
| JP | H11-245626 | 9/1999 |
| JP | 2001-354010 | 12/2001 |
| JP | 2003-170705 | 6/2003 |
| JP | 2010-195357 | 9/2010 |
| JP | 2010-208367 | 9/2010 |
| JP | 2011-093452 | 5/2011 |
| KR | 2004-0027035 A * | 4/2004 |
| WO | WO-2012/098895 A1 * | 7/2012 |

OTHER PUBLICATIONS

International Search Report for International Application No. PCT/JP2014/060100 dated Jun. 17, 2014, 4 pages, Japan.

* cited by examiner

| | Conventional Example | Comparative Example 1 | Comparative Example 2 | Working Example 1 | Working Example 2 | Working Example 3 | Working Example 4 | Working Example 5 | Working Example 6 | Working Example 7 | Working Example 8 |
|---|---|---|---|---|---|---|---|---|---|---|---|
| Center main groove position d/L (%) | d=0 | −100 | 105 | 5 | 100 | 50 | 50 | 50 | 50 | 50 | 50 |
| Distance Do, Di | Do=Di | Do<Di | Do=Di | Do=Di | Do=Di | Do=Di | Do=Di | Do=Di | Do=Di | Do=Di | Do=Di |
| Center land portion width Wo, Wi | Wi=Wo | Wi<Wo | Wi<Wo | Wi<Wo | Wi<Wo | Wi<Wo | Wi<Wo | Wi<Wo | Wi<Wo | Wi<Wo | Wi<Wo |
| Center land portion width ratio Wo/Wi | 1.00 | 1.01 | 1.01 | 1.01 | 1.01 | 1.02 | 1.35 | 1.40 | 1.20 | 1.35 | 1.35 |
| Side main groove width ratio Lo/Li | 1.00 | 0.80 | 1.03 | 1.03 | 1.03 | 1.03 | 1.03 | 1.03 | 1.03 | 1.05 | 1.25 |
| Center land portion narrow groove/inclined groove intersection angle [°] | 25 | 25 | 25 | 25 | 25 | 25 | 25 | 25 | 25 | 25 | 25 |
| Shoulder land portion circumferential narrow groove (width) | - | - | - | - | - | - | - | - | - | - | - |
| Shoulder land portion rib width | - | - | - | - | - | - | - | - | - | - | - |
| Narrow groove/inclined groove depth D/GD (%) | 50 | 50 | 50 | 50 | 50 | 50 | 50 | 50 | 50 | 50 | 50 |
| Main groove wall angle α, β | β=α | β=α | β=α | β=α | β=α | β=α | β=α | β=α | β=α | β=α | β=α |
| Steering stability performance | 100 | 97 | 107 | 102 | 105 | 103 | 104 | 105 | 104 | 104 | 104 |
| Water drainage performance: | 100 | 107 | 97 | 105 | 102 | 105 | 104 | 102 | 104 | 105 | 105 |

FIG. 4A

| | Working Example 9 | Working Example 10 | Working Example 11 | Working Example 12 | Working Example 13 | Working Example 14 | Working Example 15 | Working Example 16 | Working Example 17 | Working Example 18 | Working Example 19 |
|---|---|---|---|---|---|---|---|---|---|---|---|
| Center main groove position d/L (%) | 50 | 50 | 50 | 50 | 50 | 50 | 50 | 50 | 50 | 50 | 50 |
| Distance Do, Di | Do=Di | Do=Di | Do=Di | Do=Di | Do=Di | Do=Di | Do=Di | Do=Di | Do=Di | Do=Di | Do=Di |
| Center land portion width Wo, Wi | Wi<Wo | Wi<Wo | Wi<Wo | Wi<Wo | Wi<Wo | Wi<Wo | Wi<Wo | Wi<Wo | Wi<Wo | Wi<Wo | Wi<Wo |
| Center land portion width ratio Wo/Wi | 1.35 | 1.35 | 1.35 | 1.35 | 1.35 | 1.35 | 1.35 | 1.35 | 1.35 | 1.35 | 1.35 |
| Side main groove width ratio Lo/Li | 1.20 | 1.20 | 1.20 | 1.20 | 1.20 | 1.20 | 1.20 | 1.20 | 1.20 | 1.20 | 1.20 |
| Center land portion narrow groove/inclined groove intersection angle [°] | 30 | 50 | 40 | 40 | 40 | 40 | 40 | 40 | 40 | 40 | 40 |
| Shoulder land portion circumferential narrow groove (width) | - | - | ○ (larger on vehicle outer side) | ○ (larger on vehicle inner side) | ○ (equal width) | ○ (equal width) | ○ (equal width) | ○ (equal width) | ○ (equal width) | ○ (equal width) | ○ (equal width) |
| Shoulder land portion rib width | - | - | Ro=Ri | Ro=Ri | Ro<Ri | Ro<Ri | Ro<Ri | Ro<Ri | Ro<Ri | Ro<Ri | Ro<Ri |
| Narrow groove/inclined groove depth D/GD (%) | 50 | 50 | 50 | 50 | 50 | 50 | 55 | 60 | 80 | 65 | 65 |
| Main groove wall angle α, β | β=α | β=α | β=α | β=α | β=α | β=α | β=α | β=α | β=α | β=α | β<α |
| Steering stability performance | 104 | 104 | 103 | 104 | 104 | 104 | 104 | 103 | 102 | 103 | 104 |
| Water drainage performance: | 106 | 106 | 107 | 106 | 107 | 108 | 108 | 108 | 109 | 108 | 108 |

FIG. 4B

PNEUMATIC TIRE

TECHNICAL FIELD

The present technology relates to a pneumatic tire which can improve steering stability performance, while maintaining water drainage performance.

BACKGROUND

Conventionally, for example, Japanese Patent No. 4992951B discloses a pneumatic tire having a designated tire front/back mounting direction when mounted on a vehicle. In the pneumatic tire, three main grooves extending in the tire circumferential direction are provided in the tread portion, the center position of the center main groove of the three main grooves is located in a position shifted away from the tire equator to the vehicle outer side, the length of shift d from the center position of the center main groove to the tire equator is in the range of 5% to 100% of the width L of the center main groove, four rows of land portions are defined by the main grooves, and one narrow groove extending in the tire circumferential direction and a plurality of inclined grooves extending from the narrow groove towards the outer side in the tire width direction are provided in each of the two rows of center land portions located on the tire equator side of the tread portion, the width of the center land portion on the vehicle outer side is greater than the width of the center land portion on the vehicle inner side, a plurality of lug grooves extending in the tire width direction is provided in each of the two rows of shoulder land portions located the shoulder sides of the tread portion, and these lug grooves do not connect to the main grooves.

According to the pneumatic tire of Japanese Patent No. 4992951B, it is possible to reduce the noise originating from the tread pattern by providing the three main grooves in the tread portion and by preventing the lug grooves in the shoulder land portions from connecting to the main grooves. Furthermore, the center position of the center main groove is located in a position shifted away from the tire equator towards the vehicle outer side, and the width of the center land portion on the vehicle outer side is greater than the width of the center land portion on the vehicle inner side. As a result, the main groove on the vehicle outer side is brought nearer to the ground contact edge. Therefore, the reduction effect of noise originating from the tread pattern can be enhanced.

Moreover, according to the pneumatic tire of Japanese Patent No. 4992951B, the center position of the center main groove is located in a position shifted away from the tire equator to the vehicle outer side, and the length of shift d from the center position of the center main groove to the tire equator is in the range of 5% to 100% of the width L of the center main groove, so it is possible to achieve both water drainage performance and noise performance at a high level.

The pneumatic tire according to Japanese Patent No. 4992951B as described above is disclosed, in which providing three main grooves in the tread portion and arranging the center main groove near the tire equator sometimes cause a reduction in steering stability. Therefore, in the pneumatic tire according to Japanese Patent No. 4992951B, the center portion including the center main groove and the outer portions located on both outer sides of the center portion in the tread portion are constituted of mutually different rubber compositions, and it is preferable that the hardness of the center portion be greater than the hardness of the outer portions.

Thus, it is possible to maintain good steering stability while achieving both water drainage performance and noise performance.

However, in the pneumatic tire according to Japanese Patent No. 4992951B, the center position of the center main groove is located in a position shifted away from the tire equator to the vehicle outer side, so the width of the land portion on the vehicle outer side tends to be narrower. Therefore, turning or changing direction of traveling may cause a reduction in steering stability.

SUMMARY

In light of the foregoing, the present technology provides a pneumatic tire in which steering stability performance can be improved while maintaining water drainage performance.

A pneumatic tire according to the present technology has a vehicle inner/outer orientation designated when mounted on a vehicle, and includes, in a tread portion, three main grooves extending in the tire circumferential direction and four rows of land portions defined by each of the main grooves, in which one narrow groove extending in the tire circumferential direction and a plurality of inclined grooves extending from the narrow groove towards the outer side in the tire width direction are provided in each of two rows of center land portions located on the tire equator side of the tread portion, a plurality of lug grooves extending in the tire width direction is provided in each of the two rows of shoulder land portions located on the outer side in the tire width direction of the tread portion, the lug grooves do not connect to the main grooves, the distance Do on the vehicle outer side and the distance Di on the vehicle inner side from the groove edges on the shoulder land portion sides of the side main grooves on the outer side in the tire width direction of the main grooves to the tire equator are equal, the center position of the center main groove of the main grooves is located in a position shifted away from the tire equator to the vehicle inner side, the length of shift d from the center position of the center main groove to the tire equator is in the range of 5% to 100%, both inclusive, of the width L of the center main groove, and the width Wo of the center land portion on the vehicle outer side is greater than the width Wi of the center land portion on the vehicle inner side.

According to this pneumatic tire, the distance Do on the vehicle outer side and the distance Di on the vehicle inner side from the groove edges on the shoulder land portion sides of the side main grooves to the tire equator are equal, the center position of the center main groove is located in a position shifted away from the tire equator to the vehicle inner side, and the width Wo of the center land portion on the vehicle outer side is greater than the width Wi of the center land portion on the vehicle inner side. As a result, the position of each shoulder land portion with respect to the tire equator is maintained as a symmetrical position without reducing the width of the shoulder land portions on the outer side in the tire width direction, and the rigidity of the center land portion on the vehicle outer side is increased. Thus, it is possible to increase steering stability performance. On the other hand, locating the center position of the center main groove in a position shifted away from the tire equator to the vehicle inner side may reduce water drainage performance; however, by making the length of shift d from the center position of the center main groove to the tire equator in the range of 5% to 100%, both inclusive, of the width L of the center main groove, it is possible to minimize the reduction in the water drainage performance. As a result, it is possible to improve steering stability performance while maintaining water drainage performance.

Further, in the pneumatic tire according to the present technology, the ratio Wo/Wi of the width Wo of the center land portion on the vehicle outer side to the width Wi of the center land portion on the vehicle inner side is in the range of 1.02 to 1.35, both inclusive.

According to this pneumatic tire, by making Wo/Wi equal to or more than 1.02, the rigidity of the center land portion on the vehicle outer side is significantly increased relative to the rigidity of the center land portion on the vehicle inner side. Thus, it is possible to obtain a significant effect of improvement of steering stability performance. On the other hand, by making Wo/Wi equal to or less than 1.35, it is possible to minimize the bias in the arrangement of the center main groove with respect to the tire equator and to obtain a significant effect of minimizing deterioration of water drainage performance.

Further, in the pneumatic tire according to the present technology, the ratio Lo/Li of the width Lo of the side main groove on the vehicle outer side to the width Li of the side main groove on the vehicle inner side is in the range of 1.05 to 1.40, both inclusive.

According to this pneumatic tire, by making the width Lo of the side main groove on the vehicle outer side greater than the width Li of the side main groove on the vehicle inner side with Lo/Li equal to or more than 1.05, it is possible to improve water drainage performance and improve the resistance to hydroplaning. On the other hand, by making Lo/Li equal to or less than 1.40, the width Wo of the center land portion on the vehicle outer side is maintained, so it is possible to maintain the effect of improving steering stability performance.

Further, in the pneumatic tire according to the present technology, the intersection angle between the narrow groove and the inclined grooves in each of the center land portions is in the range of 30° to 50°, both inclusive.

The range of the intersection angle from 30° to 50°, both inclusive, is the range over which good water drainage performance can be obtained for the narrow groove extending in the tire circumferential direction and the inclined grooves intersecting with the narrow groove. Therefore, according to this pneumatic tire, it is possible to obtain a more significant effect of maintenance of water drainage performance.

Further, in the pneumatic tire according to the present technology, in each of the shoulder land portions on the vehicle outer side and the vehicle inner side, a circumferential narrow groove is formed connecting to each of the lug grooves and extending in the tire circumferential direction, and the widths of the circumferential narrow grooves are equal.

According to this pneumatic tire, each lug groove does not connect to the side main grooves, but it is possible to compensate water drainage performance by the circumferential narrow groove connecting to these lug grooves and extending in the tire circumferential direction. However, if the width of the circumferential narrow groove on the vehicle outer side is greater than that on the vehicle inner side, it can cause the rigidity of the shoulder land portion to reduce, which has the possibility of affecting steering stability performance, and if the width on the vehicle outer side is less than that on the vehicle inner side, it has the possibility of affecting water drainage performance. Therefore, the width of each circumferential narrow groove is made equal on the vehicle outer side and the vehicle inner side, so it is possible to obtain an appropriate effect of improvement in steering stability performance, while maintaining water drainage performance.

Further, in the pneumatic tire according to the present technology, in each of the shoulder land portions on the vehicle outer side and the vehicle inner side, a circumferential narrow groove is formed connecting to each of the lug grooves and extending in the tire circumferential direction, a rib is formed sandwiched between the circumferential narrow groove and the side main groove, and the width Ro of the rib on the vehicle outer side is less than the width Ri of the rib on the vehicle inner side.

According to this pneumatic tire, by making the width Ro of the rib on the vehicle outer side less than the width Ri of the rib on the vehicle inner side, it is possible to make the lug grooves in the shoulder land portion on the vehicle outer side longer. Therefore, the groove volume ratio of the shoulder land portion on the vehicle outer side is increased, the water drainage function of the shoulder land portion on the vehicle outer side is improved, so it is possible to obtain a significant effect of maintaining water drainage performance.

Further, in the pneumatic tire according to the present technology, in each of the center land portions, the groove depth D of the narrow groove and the inclined grooves provided within a range of 65% to 75%, both inclusive, of the widths Wo, Wi, which are from the tire equator side to the outer side in the tire width direction, is equal to or less than 55% of the groove depth GD of the main grooves.

According to this pneumatic tire, the groove depth D of the narrow grooves and the inclined grooves in the range close to the tire equator is made shallower, so the rigidity of the center land portions is increased, and it is possible to obtain a significant effect of improving steering stability performance. Making the groove depth D of the narrow grooves and the inclined grooves provided within the range close to the tire equator equal to or less than 55% of the groove depth GD of the main grooves is preferable in order to improve the rigidity of the center land portions.

Further, in the pneumatic tire according to the present technology, in a meridian cross-section, regarding the angles of the groove walls of the main grooves with respect to the profile normal line of the tread surface, the angles of the center main groove and the side main groove on the vehicle outer side are greater than that of the side main groove on the vehicle inner side.

According to this pneumatic tire, the angle of the groove wall of the center main groove and the groove wall on the vehicle outer side of the side main groove is greater than the angle of the groove wall on the vehicle inner side of the side main groove, so the rigidity of the center land portion and the shoulder land portion on the vehicle outer side is increased so that collapsing in the tire width direction is minimized, and it is possible to obtain a significant effect of improvement in steering stability performance.

The pneumatic tire according to the present technology can improve steering stability performance, while maintaining water drainage performance.

BRIEF DESCRIPTION OF THE DRAWINGS

FIGS. 4A-4B include a table showing results of performance testing of pneumatic tires according to working examples of the present technology.

DETAILED DESCRIPTION

An Embodiment of the present technology is described below in detail based on the drawings. However, the present technology is not limited to the embodiment. Further, the constituent elements of the embodiment include those that can be easily replaced by a person skilled in the art or that are substantially identical. Furthermore, a plurality of modified examples described in the embodiment can be combined as desired within the scope of obviousness by a person skilled in the art.

Figure 1:
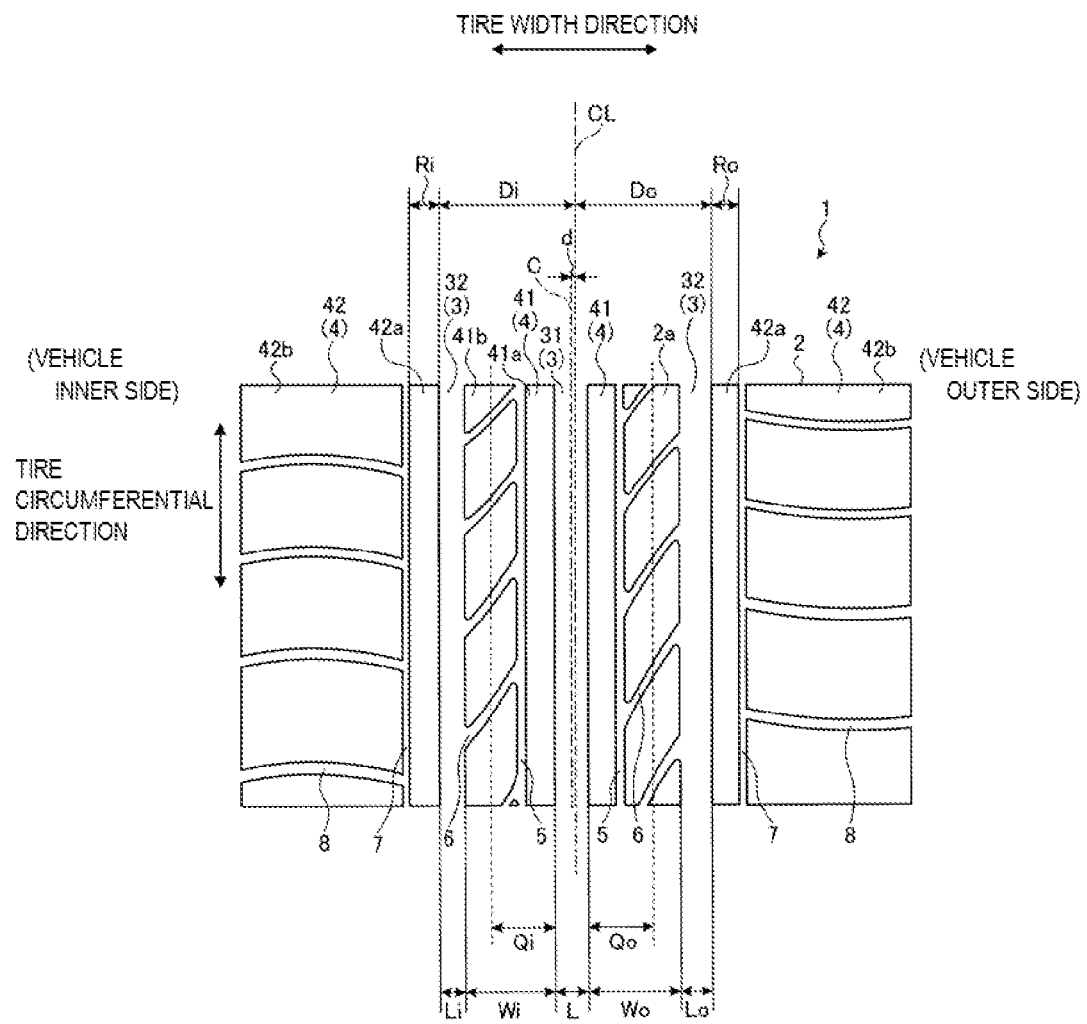
FIG. 1 is a plan view of a pneumatic tire according to an embodiment of the present technology.
Figure 2:
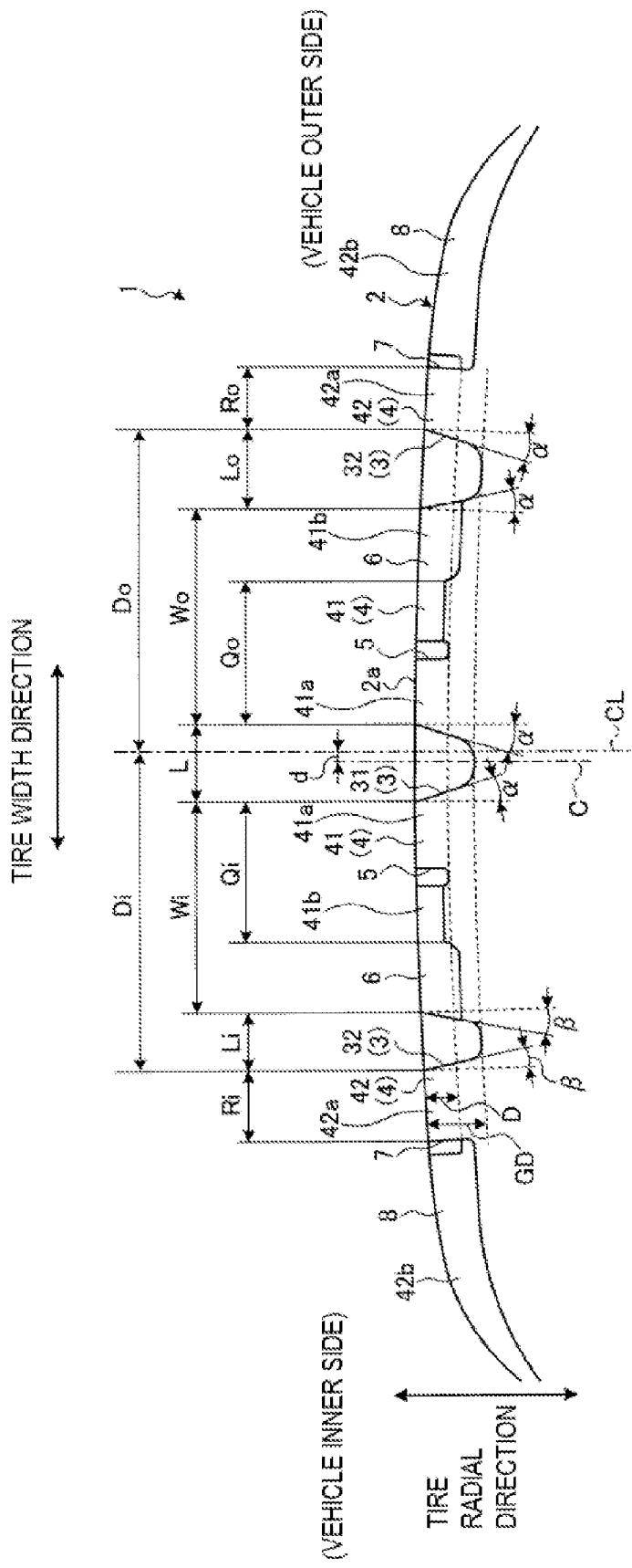
FIG. 2 is a meridian cross-sectional view of a pneumatic tire according to an embodiment of the present technology.
Figure 3:
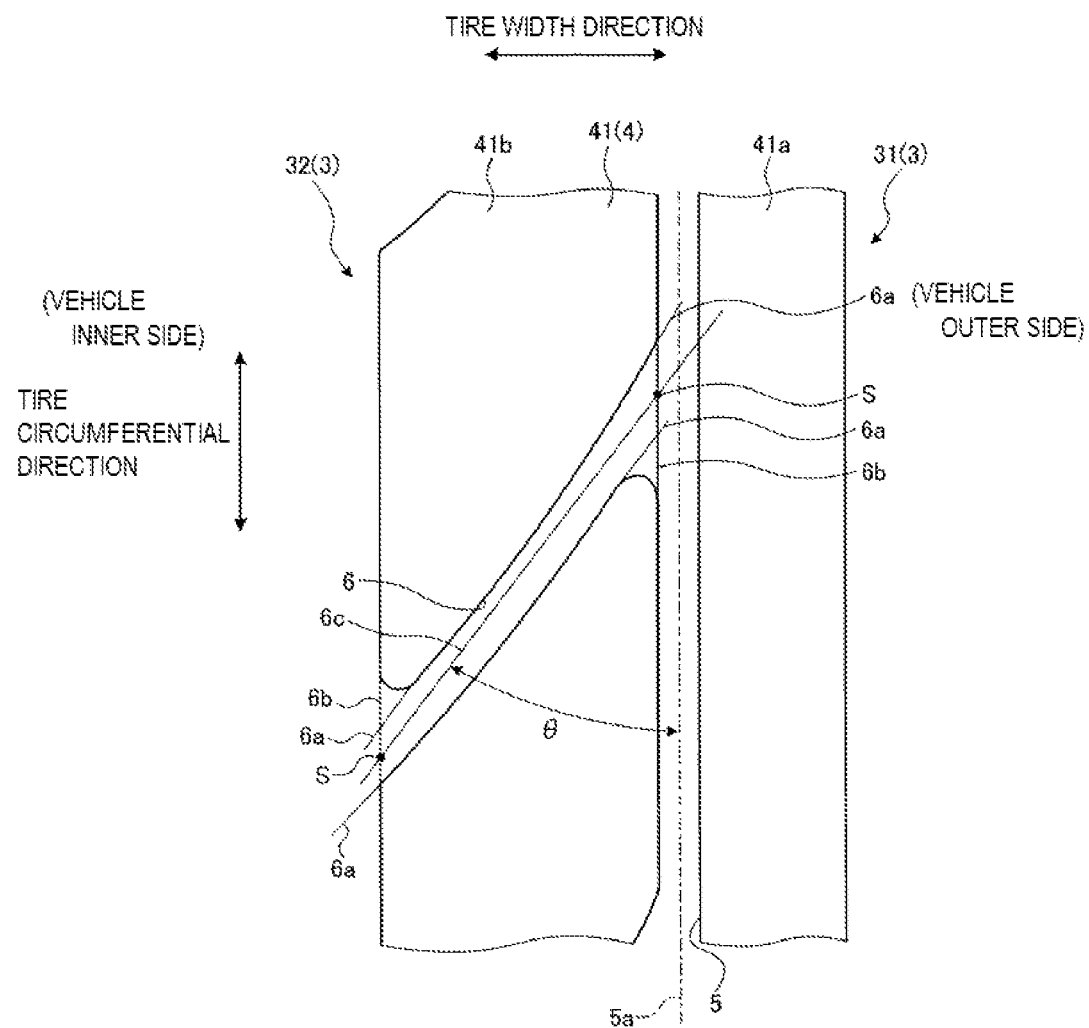
FIG. 3 is a partial enlarged plan view of the pneumatic tire illustrated in FIG. 1.

FIG. 1 is a plan view of a pneumatic tire according to this embodiment, FIG. 2 is a meridian cross-sectional view of a pneumatic tire according to an embodiment of the present invention, and FIG. 3 is a partial enlarged plan view of the pneumatic tire illustrated in FIG. 1.

In the following description, "tire radial direction" refers to a direction orthogonal to the rotational axis (not illustrated) of a pneumatic tire 1; "inner side in the tire radial direction" refers to the side facing the rotational axis in the tire radial direction; and "outer side in the tire radial direction" refers to the side distanced from the rotational axis in the tire radial direction. Further, "tire width direction" refers to the direction parallel to the rotational axis; "inner side in the tire width direction" refers to the side facing the tire equator (tire equatorial plane, tire equatorial line) CL in the tire width direction; and "outer side in the tire width direction" refers to the side distanced from the tire equator CL in the tire width direction. Furthermore, "tire circumferential direction" refers to a circumferential direction with the rotational axis as a center axis. Furthermore, "tire equator CL" refers to the plane that is orthogonal to the rotational axis of the pneumatic tire 1 and that passes through the center of the tire width of the pneumatic tire 1. Tire equatorial line of the tire equator CL refers to the line in the circumferential direction of the pneumatic tire 1 that lies on the tire equatorial plane. In this embodiment, "tire equator" is given the same "CL" reference symbol as that used for the tire equatorial plane and tire equatorial line.

Further, in cases where the pneumatic tire 1 of this embodiment is mounted on a vehicle (not illustrated), orientations in the tire width direction with respect to the inner side and the outer side of the vehicle are designated. While the designation of orientation is not explicitly illustrated in the drawings, the orientation is indicated, for example, by a sign provided on the side walls of the pneumatic tire 1. Hereinafter, a side facing the inner side of the vehicle when mounted on the vehicle is referred to as a "vehicle inner side" and a side facing the outer side of the vehicle is referred to as a "vehicle outer side". Note that the designations of the vehicle inner side and the vehicle outer side are not limited to cases when mounted on the vehicle. For example, in cases when assembled on a rim, orientation of the rim with respect to the inner side and the outer side of the vehicle in the tire width direction is set. Therefore, in cases when the pneumatic tire 1 is assembled on a rim, the orientation with respect to the inner side (vehicle inner side) and the outer side (vehicle outer side) of the vehicle in the tire width direction is designated. Further, in a tread portion 2, the vehicle inner side refers to the inner side of the vehicle ranging from the tire equator CL when mounted on a vehicle, and vehicle outer side refers to the outer side of the vehicle ranging from the tire equator CL when mounted on a vehicle.

As illustrated in FIGS. 1 and 2, the pneumatic tire 1 according to the embodiment includes the tread portion 2. The tread portion 2 is formed from a rubber material, is exposed on the outermost side in the tire radial direction of the pneumatic tire 1, and the surface thereof constitutes the profile of the pneumatic tire 1 as a tread surface 2a.

Further, the pneumatic tire 1 according to the embodiment includes a tread pattern in the tread portion 2. Specifically, three main grooves 3 are disposed in parallel to each other in the tire width direction and extend along the tire circumferential direction on the tread surface 2a of the tread portion 2. Further, four rib-like land portions 4 that extend along the tire circumferential direction are defined by the three main grooves 3 on the tread surface 2a of the tread portion 2.

Further, in this embodiment, as illustrated in FIGS. 1 and 2, one of the main grooves 3 that is closest to the tire equator CL on the innermost side in the tire width direction is referred to as a center main groove 31. Furthermore, the other main grooves 3 on the outer side in the tire width direction are referred to as side main grooves 32. In addition, the two rows of land portions 4 between the center main groove 31 and the side main grooves 32 are referred to as center land portions 41. Furthermore, the land portions 4 on the outer side in the tire width direction of the side main grooves 32 are referred to as shoulder land portions 42.

One narrow groove 5 is formed extending in the tire circumferential direction in the center land portion 41 on the tread surface 2a. Further, inclined grooves 6 are provided in the center land portion 41 extending from the narrow groove 5 towards the outer side in the tire width direction at an inclination with respect to the tire circumferential direction. A plurality of the inclined grooves 6 is provided in parallel to each other in the tire circumferential direction on the outer side in the tire width direction of the narrow groove 5 in the center land portion 41. One end of the inclined groove 6 connects to and terminates at the narrow groove 5 and thereby does not connect to the center main groove 31, and the other end thereof connects to the side main groove 32. In FIG. 1, the inclined grooves 6 are illustrated with the same inclination direction in each of the center land portions 41 on the vehicle outer side and the vehicle inner side, but their inclination directions may be opposite. The groove depths of the narrow groove 5 and the inclined grooves 6 are less than the groove depths of the main grooves 3. In this way, in the center land portion 41, a rib 41a is formed so that the inner side in the tire width direction thereof is adjacent to the center main groove 31, and blocks 41b are formed so that the outer side in the tire width direction thereof is adjacent to the side main groove 32, by the narrow groove 5 and the inclined grooves 6.

One circumferential narrow groove 7 that extends in the tire circumferential direction is formed in the shoulder land portion 42 on the tread surface 2a. Further, lug grooves 8 that extend from the circumferential narrow groove 7 towards the outer side in the tire width direction and that intersect with the tire circumferential direction are provided in the shoulder land portion 42. A plurality of the lug grooves 8 is provided in parallel to each other in the tire circumferential direction on the outer side in the tire width direction of the circumferential narrow groove 7 in the shoulder land portion 42. One end of the lug groove 8 connects to and terminates at the circumferential narrow groove 7 and thereby does not connect to the side main groove 32, and the other end thereof is open to the outer side in the tire width direction of the tread portion 2. The lug grooves 8 are formed curved, but they may have a straight line form, and if curved, the curve directions in the shoulder land portions 42 on the vehicle outer side and the vehicle inner side are made opposite to each other, as illustrated in FIG. 1. The groove depths of the narrow groove 7 and the lug grooves 8 are less than the groove depths of the main grooves 3. In this way, in the shoulder land portion 42, a rib 42a is formed so that the inner side in the tire width direction thereof is adjacent to the side main groove 32, and blocks 42b are formed so that the outer side in the tire width direction thereof is located on the outer side in the tire width direction of the tread portion 2, by the circumferential narrow groove 7 and the lug grooves 8.

In the pneumatic tire 1 having the above-described configuration, the center position C of the center main groove 31 is located in a position shifted away from the tire equator CL to the vehicle inner side. Specifically, the length of shift d from the center position C of the center main groove 31 to the tire equator CL is within the range of 5% to 100%, both inclusive, of the width L of the center main groove 31.

Further, in the two rows of center land portions 41, the width Wo of the center land portion 41 on the vehicle outer side is formed greater than the width Wi of the center land portion 41 on the vehicle inner side.

In addition, the distance Do from the groove edge on the shoulder land portion 42 side of the side main groove 32 on the vehicle outer side to the tire equator CL and the distance Di from the groove edge on the shoulder land portion 42 side of the side main groove 32 on the vehicle inner side to the tire equator CL are formed equal.

In other words, the pneumatic tire 1 according to this embodiment has a vehicle inside/outside orientation designated when mounted on a vehicle. The pneumatic tire 1 has the tread portion 2 provided with three main grooves 3 extending in the tire circumferential direction and four rows of land portions 4 defined by each of the main grooves 3; wherein, each of two rows of center land portions 41 located on the tire equator CL side of the tread portion 2 is provided with one narrow groove 5 extending in the tire circumferential direction and a plurality of inclined grooves 6 extending towards the outer side in the tire width direction from the narrow groove 5, each of the two rows of shoulder land portions 42 located on the outer side in the tire width direction of the tread portion 2 is provided with a plurality of lug grooves 8 extending in the tire width direction and not connecting to the main grooves 3, the distance Do on the vehicle outer side and the distance Di on the vehicle inner side from the groove edges on the shoulder land portion 42 sides of the side main grooves 32 on the outer side in the tire width direction of the main grooves 3 to the tire equator CL are made equal, the center position C of the center main groove 31 of the main grooves 3 is located in a position shifted away from the tire equator CL to the vehicle inner side, the length of shift d from the center position C of the center main groove 31 to the tire equator CL is within the range of 5% to 100%, both inclusive, of the width L of the center main groove 31, and the width Wo of the center land portion 41 on the vehicle outer side is larger than the width Wi of the center land portion 41 on the vehicle inner side.

According to this pneumatic tire 1, the distance Do on the vehicle outer side and the distance Di on the vehicle inner side from the groove edges on the shoulder land portion 42 sides of the side main grooves 32 to the tire equator CL are made equal, the center position C of the center main groove 31 is located in a position shifted away from the tire equator CL to the vehicle inner side, and the width Wo of the center land portion 41 on the vehicle outer side is larger than the width Wi of the center land portion 41 on the vehicle inner side, so the balance is maintained by making the position of each shoulder land portion 42 symmetrical with respect to the tire equator CL without reducing the width of the shoulder land portion 42 on the outer side in the tire width direction, and the rigidity of the center land portion 41 on the vehicle outer side is increased; thus it is possible to increase steering stability performance. On the other hand, the center position C of the center main groove 31 is located in a position that is shifted away from the tire equator CL to the vehicle inner side, so although there is a possibility that water drainage performance will be reduced, by making the length of shift d from the center position C of the center main groove 31 to the tire equator CL within the range of 5% to 100% of the width L of the center main groove 31, it is possible to minimize the reduction in water drainage performance. As a result, it is possible to improve steering stability performance while maintaining water drainage performance.

Moreover, according to this pneumatic tire 1, it is possible to reduce the noise originating from the tread pattern by providing the three main grooves 3 in the tread portion 2 and preventing the lug grooves 8 in the shoulder land portions 42 from connecting to the main grooves 3.

Further, in the pneumatic tire 1 according to this embodiment, the ratio Wo/Wi of the width Wi of the center land portion 41 on the vehicle inner side and the width Wo of the center land portion 41 on the vehicle outer side is preferably within the range of 1.02 to 1.35, both inclusive.

According to this pneumatic tire 1, by making Wo/Wi equal to or greater than 1.02, the rigidity of the center land portion 41 on the vehicle outer side is significantly increased relative to the rigidity of the center land portion 41 on the vehicle inner side, so it is possible to obtain a significant effect of improvement of steering stability performance. On the other hand, by making Wo/Wi equal to or less than 1.35, it is possible to minimize the bias in the arrangement of the center main groove 31 with respect to the tire equator CL and to obtain a significant effect of minimizing the deterioration of water drainage performance.

Further, in the pneumatic tire 1 according to this embodiment, the ratio Lo/Li of the width Li of the side main groove 32 on the vehicle inner side and the width Lo of the side main groove 32 on the vehicle outer side, as illustrated in FIGS. 1 and 2, is preferably within the range of 1.05 to 1.40, both inclusive.

According to this pneumatic tire 1, by making the width Lo of the side main groove 32 on the vehicle outer side greater than the width Li of the side main groove 32 on the vehicle inner side with Lo/Li equal to or greater than 1.05, it is possible to improve water drainage performance and to improve the resistance to hydroplaning. On the other hand, by making Lo/Li equal to or less than 1.40, the width Wo of the center land portion 41 on the vehicle outer side is maintained, so it is possible to maintain the effect of improving steering stability performance.

Further, in the pneumatic tire 1 according to this embodiment, in each center land portion 41, the intersection angle θ between the narrow groove 5 and the inclined grooves 6 (see FIG. 3) is preferably within the range of 30° to 50°, both inclusive.

Specifically, as illustrated in FIG. 3, the intersection angle θ is an angle on the acute angle side where a line 6c connecting each of the centers S between intersections where each reference line 6a extending along each groove edge of the inclined groove 6 intersects with reference lines 6b extending along the narrow groove 5 and the side main groove 32 at both openings of the inclined groove 6 intersects with the center line 5a of the narrow groove 5. Note that, in FIG. 3, the center land portion 41 on the vehicle inner side is illustrated, but the center land portion 41 on the vehicle outer side is the same.

The range of the intersection angle θ of 30° to 50°, both inclusive, is a range over which the narrow groove 5 extending in the tire circumferential direction and the inclined groove 6 intersecting with narrow groove 5 can have good water drainage performance. Therefore, according to this pneumatic tire 1, it is possible to obtain a more significant effect of maintaining water drainage performance.

Further, in the pneumatic tire 1 according to this embodiment, as illustrated in FIGS. 1 and 2, it is preferable that a circumferential narrow groove 7 connecting with each lug groove 8 and extending in the tire circumferential direction be formed in each of the shoulder land portions 42 on the vehicle outer side and the vehicle inner side and that the widths of circumferential narrow grooves 7 on the vehicle outer side and the vehicle inner side be equal to each other.

According to this pneumatic tire 1, each lug groove 8 does not connect to the side main groove 32, but it is possible to compensate water drainage performance by the circumferential narrow grooves 7 connecting with the lug grooves 8 and extending in the tire circumferential direction. However, if the width of the circumferential narrow groove 7 on the vehicle outer side is greater than that on the vehicle inner side, it can cause the rigidity of the shoulder land portions 42 to be reduced, which has the possibility of affecting steering stability performance, and if the width on the vehicle outer side is less than that on the vehicle inner side, it has the possibility of affecting water drainage performance. Therefore, the widths of the circumferential narrow grooves 7 are made equal on the vehicle outer side and the vehicle inner side, so it is possible to obtain an appropriate effect of improvement in steering stability performance, while maintaining water drainage performance.

Further, in the pneumatic tire 1 according to this embodiment, as illustrated in FIGS. 1 and 2, it is preferable that the circumferential narrow groove 7 connecting with each lug groove 8 and extending in the tire circumferential direction be formed in each of the shoulder land portions 42 on the vehicle outer side and the vehicle inner side, that the rib 42a be formed sandwiched by the circumferential narrow groove 7 and the side main groove 32, and that the width Ro of the rib 42a on the vehicle outer side be less than the width Ri of the rib 42a on the vehicle inner side.

According to this pneumatic tire 1, by making the width Ro of the rib 42a on the vehicle outer side less than the width Ri of the rib 42a on the vehicle inner side, it is possible to make the length of the lug grooves 8 in the shoulder land portion 42 on the vehicle outer side longer. Therefore, the groove volume ratio of the shoulder land portion 42 on the vehicle outer side is increased, the water drainage function of the shoulder land portion 42 on the vehicle outer side is improved, so it is possible to obtain a significant effect of maintaining water drainage performance.

Further, in the pneumatic tire 1 according to this embodiment, as illustrated in FIG. 2, in each center land portion 41, the groove depth D of the narrow grooves 5 and the inclined grooves 6 provided in ranges Qo, Qi which are in a range of 65% to 75%, both inclusive, of the widths Wo, Wi, which are from the tire equator CL side to the outer side in the tire width direction, is preferably equal to or less than 55% of the groove depth GD of the main grooves 3.

Note that the groove depth D of the narrow grooves 5 and the inclined grooves 6 is the deepest groove depth in the ranges Qo, Qi. If the groove depths of the main grooves 3 are mutually different, the groove depth of the deepest main groove 3 is set as GD.

According to this pneumatic tire 1, the groove depth D of the narrow grooves 5 and the inclined grooves 6 in the ranges Qo, Qi located close to the tire equator CL is made shallower, so the rigidity of the center land portions 41 is increased, and it is possible to obtain a significant effect of improving steering stability performance. Note that it is preferable that the groove depth D of the narrow grooves 5 and the inclined grooves 6 provided in the ranges Qo, Qi be equal to or less than 55% of the groove depth GD of the main grooves 3 in order to improve the rigidity of the center land portions 41. On the other hand, it is preferable that the groove depth D of the narrow grooves 5 and the inclined grooves 6 provided in the ranges Qo, Qi is equal to or greater than 35% in order to maintain water drainage performance.

Also, as illustrated in FIG. 2, in the pneumatic tire 1 according to this embodiment, in a meridian cross-section, preferably the angle α between the groove wall of the center main groove 31 and the profile normal line of the tread surface 2a, and the angle α between the groove wall of the side main groove 32 on the vehicle outer side and the profile normal line of the tread surface 2a are greater than the angle β between the groove wall of the side main groove 32 on the vehicle inner side and the profile normal line of the tread surface 2a.

According to this pneumatic tire 1, the angle α of the groove walls of the center main groove 31 and the side main groove 32 on the vehicle outer side is greater than the angle β of the groove wall of the side main groove 32 on the vehicle inner side, so the rigidity of the center land portion 41 and the shoulder land portion 42 on the vehicle outer side is increased so that collapsing in the tire width direction is minimized, and it is possible to obtain a significant effect of improvement in steering stability performance.

Preferably the angles α, β are equal to or greater than 2° in order to obtain sufficient radius of the chamfers at the groove bottoms of the main grooves 3 and to ensure groove depth and are equal to or less than 20° in order to maintain water drainage performance of the main grooves 3. Further, preferably the difference between the angle α and the angle β is in the range of 2° to 15°, both inclusive, in order to increase the rigidity of the land portions 4 of the tread portion 2 and to obtain significant steering stability performance.

Here, the Do, Di, d, Wo, Wi, Lo, Li, θ, width of the circumferential narrow groove 7, Ro, Ri, Qo, Qi, D, GD, α, β as described above are defined when the pneumatic tire 1 is assembled onto a regular rim and inflated to 5% of the regular inner pressure with 0% of the regular load (no load condition) applied.

Here, "regular rim" refers to a "standard rim" defined by the Japan Automobile Tyre Manufacturers Association Inc. (JATMA), a "design rim" defined by the Tire and Rim Association, Inc. (TRA), or a "measuring rim" defined by the European Tyre and Rim Technical Organisation (ETRTO). In addition, "regular inner pressure" refers to "maximum air pressure" defined by JATMA, a maximum value in "tire load limits at various cold inflation pressures" defined by TRA, and "inflation pressures" defined by ETRTO. Note that "regular load" refers to "maximum load capacity" defined by JATMA, a maximum value in "tire load limits at various cold inflation pressures" defined by TRA, and "load capacity" defined by ETRTO.

EXAMPLES

In the working examples, performance tests were carried out for steering stability performance and water drainage performance for a plurality of types of pneumatic tires under different conditions (see FIGS. 4A-4B).

In these performance tests, pneumatic tires having a tire size of 185/60R15 were assembled on a 15×6J rim, inflated to the regular inner pressure (220 kPa), and mounted on a test vehicle (displacement of 1500 cc, front-engine, rear-wheel (FR) vehicle, manufactured in Japan).

The method of evaluation of steering stability performance included driving the test vehicle at speeds in the range of 60 km/h to 100 km/h, and evaluation of the steering stability performance by sensory evaluation by experienced drivers for items such as turning stability, rigidity feeling, and steering characteristics when changing lanes and when cornering. Index evaluation against a standard score (100) of a Conventional Example was conducted based on the sensory evaluation. In this evaluation, the larger the index, the better the steering stability performance.

Further, the method of evaluating the water drainage performance included driving the test vehicle straight into a hydro pool of water depth 10 mm, gradually increasing the speed of entry into the pool, and measuring the limiting speed at which hydroplaning of the pneumatic tire occurred (slip ratio 10%). Evaluations were performed by indexing the measurement results with Conventional Example as the standard score (100). In the evaluations, the larger the index (the faster the speed at which a slip ratio of 10% was reached), the more difficult it is for hydroplaning to occur and the better the water drainage performance.

In FIGS. 4A-4B, pneumatic tires according to Conventional Example, Comparative Examples 1 and 2, and Working Examples 1 to 19 were provided with three main grooves extending in the tire circumferential direction and four rows of land portions defined by each of the main grooves in the tread portion, each of the two rows of center land portions located on the tire equator side of the tread portion was provided with one narrow groove extending in the tire circumferential direction and a plurality of inclined grooves extending from the narrow groove towards the outer side in the tire width direction, each of the two shoulder land portions located on the outer side in the tire width direction of the tread portion was provided with a plurality of lug grooves extending in the tire width direction, and these lug grooves did not connect to the main grooves.

The pneumatic tire according to Conventional Example had the center position of the center main groove located on the tire equator. Further, the pneumatic tire according to Comparative Example 1 had the center position of the center main groove located in a position shifted away from the tire equator to the vehicle outer side. Furthermore, the center position of the center main groove in Comparative Example 2 was located in a position shifted away from the tire equator to the vehicle inner side, but the length of shift d from the center position of the center main groove to the tire equator was 105% of the width L of the center main groove.

On the other hand, in the pneumatic tires according to Working Examples 1 to 19, the distance Do on the vehicle outer side and the distance Di on the vehicle inner side from the groove edges on the shoulder land portion sides of the side main grooves on the outside in the tire width direction to the tire equator were made equal, the center position of the center main groove was located shifted away from the tire equator to the vehicle inner side, the length of shift d from the center position of the center main groove to the tire equator was in the range of 5% to 100%, both inclusive, of the width L of the center main groove, and the width Wo of the center land portion on the vehicle outer side was greater than the width Wi of the center land portion on the vehicle inner side.

As illustrated in the test results in FIGS. 4A-4B, it can be seen that the pneumatic tires according to Working Examples 1 to 19 have improved in the steering stability performance, while maintaining the water drainage performance.

What is claimed is:

1. A pneumatic tire having a vehicle inner/outer orientation designated when mounted on a vehicle, the pneumatic tire comprising a tread portion;
   the tread portion including:
   three main grooves extending in a tire circumferential direction; and
   four rows of land portions defined by each of the main grooves;
   one narrow groove and a plurality of inclined grooves being provided in each of two rows of center land portions located on a tire equator side of the tread portion, the one narrow groove extending in the tire circumferential direction, the plurality of inclined grooves extending from the narrow groove towards an outer side in a tire width direction;
   a plurality of lug grooves being provided in each of two rows of shoulder land portions located on an outer side in the tire width direction of the tread portion, the plurality of lug grooves extending in the tire width direction and not connecting to the main grooves,
   a distance Do on a vehicle outer side and a distance Di on a vehicle inner side from groove edges on shoulder land portion sides of side main grooves located on the outer side in the tire width direction of the main grooves to the tire equator being equal,
   a center position of a center main groove of the main grooves being located in a position shifted away from the tire equator to the vehicle inner side, and a length of shift d from the center position of the center main groove to the tire equator being in the range of 5% to 100%, both inclusive, of a width L of the center main groove; and
   a width Wo of the center land portion on the vehicle outer side being greater than a width Wi of the center land portion on the vehicle inner side;
   wherein a ratio Lo/Li of a width Lo of the side main groove on the vehicle outer side to a width Li of the side main groove on the vehicle inner side is in the range of 1.05 to 1.40, both inclusive.

2. The pneumatic tire according to claim 1, wherein a ratio Wo/Wi of the width Wo of the center land portion on the vehicle outer side to the width Wi of the center land portion on the vehicle inner side is in the range of 1.02 to 1.35, both inclusive.

3. The pneumatic tire according to claim 2, wherein an intersection angle between the narrow groove and the inclined grooves in each of the center land portions is in the range of 30° to 50°, both inclusive.

4. The pneumatic tire according to claim 3, wherein, in each of the shoulder land portions on the vehicle outer side and the vehicle inner side, a circumferential narrow groove is formed connecting to each of the lug grooves and extending in the tire circumferential direction, and widths of the respective circumferential narrow grooves are equal.

5. The pneumatic tire according to claim 4, wherein, in each of the shoulder land portions on the vehicle outer side and the vehicle inner side, a circumferential narrow groove is formed connecting to each of the lug grooves and extending in the tire circumferential direction, a rib is formed sandwiched between the circumferential narrow groove and the side main groove, and a width Ro of the rib on the vehicle outer side is less than a width Ri of the rib on the vehicle inner side.

6. The pneumatic tire according to claim 5, wherein, in each of the center land portions, the narrow groove and the inclined grooves are provided within a range of 65% to 75%, both inclusive, of the widths Wo, Wi, the widths Wo, Wi being from a tire equator side to the outer side in the tire width direction, and a groove depth of the narrow groove and the inclined grooves is equal to or less than 55% a groove depth GD of the main grooves.

7. The pneumatic tire according to claim 6, wherein, in a meridian cross-section, among groove wall angles of the main grooves with respect to a profile normal line of a tread surface, groove wall angles of the center main groove and the side main groove on the vehicle outer side are greater than a groove wall angle of the side main groove on the vehicle inner side.

8. The pneumatic tire according to claim 1, wherein an intersection angle between the narrow groove and the inclined grooves in each of the center land portions is in the range of 30° to 50°, both inclusive.

9. The pneumatic tire according to claim 1, wherein, in each of the shoulder land portions on the vehicle outer side and the vehicle inner side, a circumferential narrow groove is formed connecting to each of the lug grooves and extending in the tire circumferential direction, and widths of the respective circumferential narrow grooves are equal.

10. The pneumatic tire according to claim 1, wherein, in each of the shoulder land portions on the vehicle outer side and the vehicle inner side, a circumferential narrow groove is formed connecting to each of the lug grooves and extending in the tire circumferential direction, a rib is formed sandwiched between the circumferential narrow groove and the side main groove, and a width Ro of the rib on the vehicle outer side is less than a width R1 of the rib on the vehicle inner side.

11. The pneumatic tire according to claim 1, wherein, in each of the center land portions, the narrow groove and the inclined grooves are provided within a range of 65% to 75%, both inclusive, of the widths Wo, Wi, the widths Wo, Wi being from a tire equator side to the outer side in the tire width direction, and a groove depth of the narrow groove and the inclined grooves is equal to or less than 55% a groove depth GD of the main grooves.

12. The pneumatic tire according to claim 1, wherein, in a meridian cross-section, among groove wall angles of the main grooves with respect to a profile normal line of a tread surface, groove wall angles of the center main groove and the side main groove on the vehicle outer side are greater than a groove wall angle of the side main groove on the vehicle inner side.

13. A pneumatic tire having a vehicle inner/outer orientation designated when mounted on a vehicle, the pneumatic tire comprising a tread portion;
the tread portion including:
three main grooves extending in a tire circumferential direction; and
four rows of land portions defined by each of the main grooves;
one narrow groove and a plurality of inclined grooves being provided in each of two rows of center land portions located on a tire equator side of the tread portion, the one narrow groove extending in the tire circumferential direction, the plurality of inclined grooves extending from the narrow groove towards an outer side in a tire width direction;
a plurality of lug grooves being provided in each of two rows of shoulder land portions located on an outer side in the tire width direction of the tread portion, the plurality of lug grooves extending in the tire width direction and not connecting to the main grooves,
a distance Do on a vehicle outer side and a distance Di on a vehicle inner side from groove edges on shoulder land portion sides of side main grooves located on the outer side in the tire width direction of the main grooves to the tire equator being equal,
a center position of a center main groove of the main grooves being located in a position shifted away from the tire equator to the vehicle inner side, and a length of shift d from the center position of the center main groove to the tire equator being in the range of 5% to 100%, both inclusive, of a width L of the center main groove; and
a width Wo of the center land portion on the vehicle outer side being greater than a width Wi of the center land portion on the vehicle inner side;
wherein, in each of the shoulder land portions on the vehicle outer side and the vehicle inner side, a circumferential narrow groove is formed connecting to each of the lug grooves and extending in the tire circumferential direction, a rib is formed sandwiched between the circumferential narrow groove and the side main groove, and a width Ro of the rib on the vehicle outer side is less than a width R1 of the rib on the vehicle inner side.

14. A pneumatic tire having a vehicle inner/outer orientation designated when mounted on a vehicle, the pneumatic tire comprising a tread portion;
the tread portion including:
three main grooves extending in a tire circumferential direction; and
four rows of land portions defined by each of the main grooves;
one narrow groove and a plurality of inclined grooves being provided in each of two rows of center land portions located on a tire equator side of the tread portion, the one narrow groove extending in the tire circumferential direction, the plurality of inclined grooves extending from the narrow groove towards an outer side in a tire width direction;
a plurality of lug grooves being provided in each of two rows of shoulder land portions located on an outer side in the tire width direction of the tread portion, the plurality of lug grooves extending in the tire width direction and not connecting to the main grooves,
a distance Do on a vehicle outer side and a distance Di on a vehicle inner side from groove edges on shoulder land portion sides of side main grooves located on the outer side in the tire width direction of the main grooves to the tire equator being equal,
a center position of a center main groove of the main grooves being located in a position shifted away from the tire equator to the vehicle inner side, and a length of shift d from the center position of the center main groove to the tire equator being in the range of 5% to 100%, both inclusive, of a width L of the center main groove; and
a width Wo of the center land portion on the vehicle outer side being greater than a width Wi of the center land portion on the vehicle inner side;
wherein, in a meridian cross-section, among groove wall angles of the main grooves with respect to a profile normal line of a tread surface, groove wall angles of the center main groove and the side main groove on the vehicle outer side are greater than a groove wall angle of the side main groove on the vehicle inner side.

* * * * *